United States Patent [19]

Binkley et al.

[11] Patent Number: 4,956,127
[45] Date of Patent: Sep. 11, 1990

[54] DOWNCOMER-TRAY ASSEMBLY AND METHOD

[75] Inventors: Michael J. Binkley, Glenn Heights; John T. Thorngren; Jorge A. Bonilla, both of Dallas; Gary W. Gage, Grand Prairie, all of Tex.

[73] Assignee: Glitsch, Inc., Dallas, Tex.

[21] Appl. No.: 320,420

[22] Filed: Mar. 8, 1989

[51] Int. Cl.⁵ ............................................. B01F 3/04
[52] U.S. Cl. ................................. 261/114.1; 261/114.3
[58] Field of Search ........................... 261/114.1, 114.3

[56] References Cited

U.S. PATENT DOCUMENTS

| | | | |
|---|---|---|---|
| 2,693,949 | 11/1954 | Huggins | 261/114.1 |
| 2,757,915 | 8/1956 | Huggins | 261/114.1 |
| 2,762,692 | 9/1956 | Spitz et al. | 261/114.1 |
| 3,282,576 | 11/1966 | Bruckert et al. | 261/114.3 |
| 3,464,679 | 9/1969 | Becker | 261/114.1 |
| 3,467,365 | 9/1969 | Webster | 261/114.1 |
| 3,959,419 | 5/1976 | Kitterman | 261/98 |
| 4,499,035 | 2/1985 | Kirkpatrick et al. | 261/114.3 |
| 4,504,426 | 3/1985 | Chuang et al. | 261/114.1 |
| 4,543,219 | 9/1985 | Yamato et al. | 261/109 |
| 4,550,000 | 10/1985 | Bentham | 261/114.1 |
| 4,597,916 | 7/1986 | Chen | 261/122.2 |
| 4,601,788 | 7/1986 | Bannon | 202/153 |
| 4,603,022 | 7/1986 | Yoneda et al. | 261/114.1 |
| 4,604,247 | 8/1986 | Chen et al. | 261/112.2 |
| 4,623,493 | 11/1986 | Bentham | 261/109 |
| 4,627,941 | 12/1986 | Bentham | 261/114.1 |

FOREIGN PATENT DOCUMENTS

| | | | |
|---|---|---|---|
| 510247 | 4/1976 | U.S.S.R. | 261/114.3 |
| 997706 | 2/1983 | U.S.S.R. | 261/114.3 |

OTHER PUBLICATIONS

Chen, Packed Column Internals, Chem. Engr., Mar. 5, 1984, pp. 40–51.
Linde Multiple Downcomer Trays, Union Carbide Corp., P.O. Box 44, Tonawanda, N.Y. 14150.

*Primary Examiner*—Tim Miles
*Attorney, Agent, or Firm*—Johnson & Gibbs

[57] ABSTRACT

A downcomer tray assembly for vapor liquid contact towers. The region of the tray beneath an upper downcomer is constructed with a raised, perforated region for improving mass transfer efficiency. The raised region reduces fluid pressure to facilitate ascending vapor therethrough. A series of louvers selectively directs the upward vapor flow into the liquid region below the downcomer to generate a more efficient vapor-liquid contact and reduced back-mixing across the tray.

19 Claims, 5 Drawing Sheets

DOWNCOMER-TRAY ASSEMBLY AND METHOD

BACKGROUND OF THE INVENTION

1. Field of the Invention

The present invention pertains to gas-liquid contacting trays and, more particularly, an improved downcomer-tray assembly incorporating a raised, active inlet area beneath the downcomer.

2. History of the Prior Art

Distillation columns are utilized to separate selected components from a multicomponent stream. Generally, such gas-liquid contact columns utilize either trays, packing or combinations thereof. In recent years the trend has been to replace the so-called "bubble caps" by sieve and valve trays in most tray column designs, and the popularity of packed columns, either random (dumped) or structured packing have been utilized in combination with the trays in order to effect improved separation of the components in the stream.

Successful fractionation in the column is dependent upon intimate contact between liquid and vapor phases. Some vapor and liquid contact devices, such as trays, are characterized by relatively high pressure drop and relatively high liquid hold-up. Another type of vapor and liquid contact apparatus, namely structured high efficiency packing, has also become popular for certain applications. Such packing is energy efficient because it has low pressure drop and low liquid hold-up. However, these very properties at times make columns equipped with structured packing difficult to operate in a stable, consistent manner. Moreover, many applications simply require the use of trays.

Fractionation column trays come in two configurations: cross-flow and counter flow. The trays generally consist of a solid tray or deck having a plurality of apertures and are installed on support rings within the tower. In cross-flow trays, vapor ascends through the apertures and contacts the liquid moving across the tray; through the "active" area thereof; in this area liquid and vapor mix and fractionation occurs. The liquid is directed onto the tray by means of a vertical channel from the tray above. This channel is referred to as the Inlet Downcomer. The liquid moves across the tray and exists through a similar channel referred to as the Exit Downcomer. The location of the downcomers determine the flow pattern of the liquid. If there are two Inlet Downcomers and the liquid is split into two streams over each tray, it is called a two pass tray. If there is only one Inlet and one Outlet Downcomer on opposite sides of the tray, it is called a single pass tray. For two or more passes, the tray is often referred to as a Multipass Tray. The number of passes generally increases as the required (design) liquid rate increases. It is the active area of the tray, however, which is of critical concern.

Not all areas of a tray are active for vapor-liquid contact. For example, the area under the Inlet Downcomer is generally a solid region. To attempt to gain more area of the tray for vapor/liquid contact, the downcomers are often sloped. The maximum vapor/liquid handling capacity of the tray generally increases with an increase in the active or Bubbling Area. There is, however, a limit as to how far one can slope the downcomer(s) in order to increase the Bubbling Area otherwise the channel will become too small. This can restrict the flow of the liquid and/or restrict the disengagement of vapor retained in the liquid, cause liquid to back up in the downcomer, and thus prematurely limit the normal maximum vapor/liquid handling capacity of the tray.

A variation for increasing the Bubbling Area and hence vapor/liquid handling capacity is a Multiple Downcomer (MD) tray. There is usually a plurality of box shaped vertical channels installed in a symmetrical pattern across the tray to direct liquid onto and off of the tray. The downcomers do not extend all the way to the tray below but stop short of the tray by a predetermined distance which is limited by a sufficient space to permit disengagement of any vapor retained in the liquid entering the Exit Downcomer. The downcomer pattern is rotated 90 degrees between successive trays. The bottom of the boxes is solid except for slots that direct the liquid onto the Bubbling Area of the tray below, in between the outlet downcomers and said tray. The MD tray falls into the category of Multipass Trays and is usually used for high liquid rates.

Addressing now select cross flow plate designs, a particularly effective tray in process columns is the sieve tray. This tray is constructed with a large number of apertures formed in the bottom surface. The apertures permit the ascending vapor to flow into direct engagement with the liquid that is flowing across the tray from the downcomer described above. When there is sufficient vapor flow upwardly through the tray, the liquid is prevented from running downwardly through the apertures (referred to as "weeping"). A small degree of weeping is normal in trays while a larger degree of weeping is detrimental to the capacity and efficiency of a tray.

The capacity of a tray is a function of the open area of holes and of tray spacing. When spacing is fixed, capacity may be increased by increasing the percent open area, but this practice is limited by decreased turndown due to weeping at low vapor rates. To overcome such weeping, a tray has been developed which is constructed from closely spaced rods of trapezoidal cross-section. They are manufactured and sold by the assignee of the present invention under the trademark SCREEN TRAY.

The trapezoidal wire members of the SCREEN TRAY are tapered upwardly, and this creates a Venturi effect to ascending vapor. Surface tension effects become pronounced with such close wire spacing. Combined with the Venturi effect produced by vapor rising through the tapered throats between the wires, surface tension phenomena reduce weeping significantly at low liquid rates and keep spray height low. The upward taper also defines a larger surface area for liquid flowing across the tray. For additional discussions of SCREEN TRAYS and another invention related thereto which improve gas-liquid contact, reference is made to co-pending, U.S. patent application Ser. No. 07/304,942 filed on Jan. 31, 1989 and assigned to the assignee of the present invention.

Tray efficiency is also known to be improved in sieve type trays by increasing the froth height of the liquid and reducing the backflow of the liquid flowing across the tray. Froth is created when vapor bubbles percolate upwardly through the liquid flowing across the tray. The suspension of the vapor in the liquid prolongs the vapor liquid contact which enhances the efficiency of the process. The longer the froth is maintained and the higher the froth is established, the greater the vapor liquid retention. Higher froth requires smaller vapor bubbles and the formation of the bubbles at a sufficiently slow rate. Likewise, backflow occurs beneath the froth when circulating currents of liquid are established during the liquid flow across the plate. This generally forms along the lateral portions thereof. These currents carry liquid back across the tray in a manner that reduces the concentration-difference driving force for mass transfer. It is the concentration-difference between the vapor and the liquid which enhances the effectiveness of the vapor-liquid contact.

The technology of gas-liquid contact is also represented in numerous prior art patents addressing process columns. These include U.S. Pat. Nos. 3,959,419, 4,604,247 and 4,597,916, each assigned to the assignee of the present invention and U.S. Pat. No. 4,603,022 issued to Mitsubishi Jukogyo Kabushiki Kaisha of Tokyo, Japan. A particularly relevant reference is seen in U.S. Pat. No. 4,499,035 assigned to Union Carbide Corporation that teaches a gas-liquid contacting tray with improved inlet bubbling means. A cross-flow tray of the type described above is therein shown with improved means for initiating bubble activity at the tray inlet comprising spaced apart, imperforate wall members extending substantially vertically upwardly and transverse to the liquid flow path. The structural configuration is said to promote activity over a larger tray surface than that afforded by simple perforated tray assemblies. This is accomplished in part by providing a raised region adjacent the downcomer area for facilitating vapor ascension therethrough.

U.S. Pat. No. 4,550,000 assigned to Shell Oil Company teaches apparatus for contacting a liquid with a gas in a relationship between vertically stacked trays in a tower. The apertures in a given tray are provided for the passage of gas in a manner less hampered by liquid coming from a discharge means of the next upper tray. Such advantages improve tray efficiency within the confines of prior art structures. Likewise, U.S. Pat. No. 4,543,219 assigned to Nippon Kayaku Kabushiki Kaisha of Tokyo, Japan teaches a baffle tray tower. The operational parameters of high gas-liquid contact efficiency and the need for low pressure loss are set forth. Such references are useful in illustrating the need for high efficiency vapor liquid contact in tray process towers. U.S. Pat. No. 4,504,426 issued to Carl T. Chuang et. al. and assigned to Atomic Energy of Canada Limited is yet another example of gas-liquid contacting apparatus. This reference likewise teaches the multitude of advantages in improving efficiency in fractionation and modifications in downcomer-tray designs. The perforated area of the tray is extended beneath the downcomer with between 0 to 25% less perforation area.

Yet another reference is seen in U.S. Pat. No. 3,410,540 issued to W. Bruckert in 1968. A downcomer outlet baffle is therein shown to control the discharge of liquid therefrom. The baffle may include either a static seal or dynamic seal. In this regard the openings from the downcomer are sufficiently small to control discharge and may be larger than the tray perforations and of circular or rectangular shape. The transient forces which may disrupt the operation of a downcomer are also more fully elaborated therein. These forces and related vapor-liquid flow problems must be considered for each application in which a downcomer feeds an underlying tray.

It would be an advantage to provide a downcomer-tray assembly manifesting increased efficiency, improved bubble propagation, uniform froth height and concomitantly homogeneous liquid flow. This would, by definition, be represented by a marked increase in Murphree plate efficiency. Such a downcomer-tray assembly is provided by the present invention wherein a raised active inlet area panel is secured beneath the downcomer. The panel has a plurality of apertures for providing vapor injection into the liquid flow which is effective in achieving greater mass transfer. Likewise one aspect of the assembly incorporating directional apertures effects the liquid flow by limiting the retrograde flow (back-mixing) in cross-flow plate applications. Reduced back-mixing increases efficiency and homogeneity is maintained across the tray.

SUMMARY OF THE INVENTION

The present invention pertains to an improved downcomer-tray assembly for a process column. More particularly, one aspect of the invention includes an improved downcomer-tray assembly for a process column of the type wherein liquid flows downwardly through a first downcomer onto a first tray and across the active area thereof. Across this active area vapor flows upwardly for interaction and mass transfer with the liquid. The liquid then passes from the tray through a second downcomer. The improvement of the present invention comprises a substantially uniformly raised active inlet area disposed beneath the first downcomer for establishing preferential vapor flow beneath the downcomer injecting vapor into engagement with liquid discharged therefrom. Uniformly raised includes a planar panel that is substantially horizontal in the column, or one that is inclined beneath the downcomer In another aspect, the invention includes the improved downtray assembly described above wherein the downcomer is constructed for providing a dynamic seal against ascending vapor flow. In one embodiment, the downcomer is constructed with a sufficiently narrow fluid discharge region that is spaced above the active inlet region for establishing a fluid reservoir and uniform discharge thereon. The discharge region can also comprise a plurality of apertures formed across the lower region of the downcomer and disposed above the active inlet area and generally parallel spaced relationship thereto. In another embodiment of the present invention, the discharge region may comprise a tapered Venturi area formed thereacross and disposed above the active inlet area in generally spaced relationship thereto.

In another aspect of the invention, the downcomer is constructed in a chordal section of the process column and the active inlet area is a chordal region of the first tray. The downcomer may also be constructed in an intermediate section of a second upper tray for discharging liquid onto an intermediate region of the first tray. With either downcomer configuration, the raised active area comprises an inlet panel constructed with a plurality of vapor flow apertures formed therethrough for injecting preferential vapor flow therein relative to the active area of the first tray. In this regard, the inlet panel comprises at least first and second planar apertured regions with the first apertured region having flow vanes disposed at an angle relative to the flow vanes of the second apertured region. The flow vanes of the first and second apertured regions are, formed, in one embodiment, generally orthogonal one to the other. With more than two apertured regions, a center, or intermediate apertured region is provided between the first and second apertured regions. The center apertured region then imparts directionalized fluid flow across an intermediate section of the tray while the second and third apertured regions direct fluid flow outwardly thereof for reducing retrograde flow across the tray.

In yet another aspect of the invention, the raised inlet panel comprises at least one pre-expanded metal section having twisted lands and slitted apertures forming directional flow louvers thereacross. In this configuration vapor and liquid may be dispersed across the tray with a predefined flow pattern maximizing efficiency therein. The tray itself may comprise a sieve tray. A particular sieve tray contemplated by the present invention includes one that is constructed of a plurality of wires having a generally trapezoidal cross section and secured one to the other in generally parallel spaced relationship.

In yet a further aspect, the present invention includes an improved method of mixing vapor with liquid discharge from a downcomer of a process column onto an underlying cross flow tray of the type wherein descending liquid mixing with ascending vapor flow through the tray. The improvement comprises the steps of disposing a raised active inlet area beneath the downcomer adjacent the tray, imparting preferential vapor flow through the active inlet area relative to the tray and directionalizing the vapor flow into the liquid discharged from the downcomer.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION OF THE PREFERRED EMBODIMENT

Figure 1:
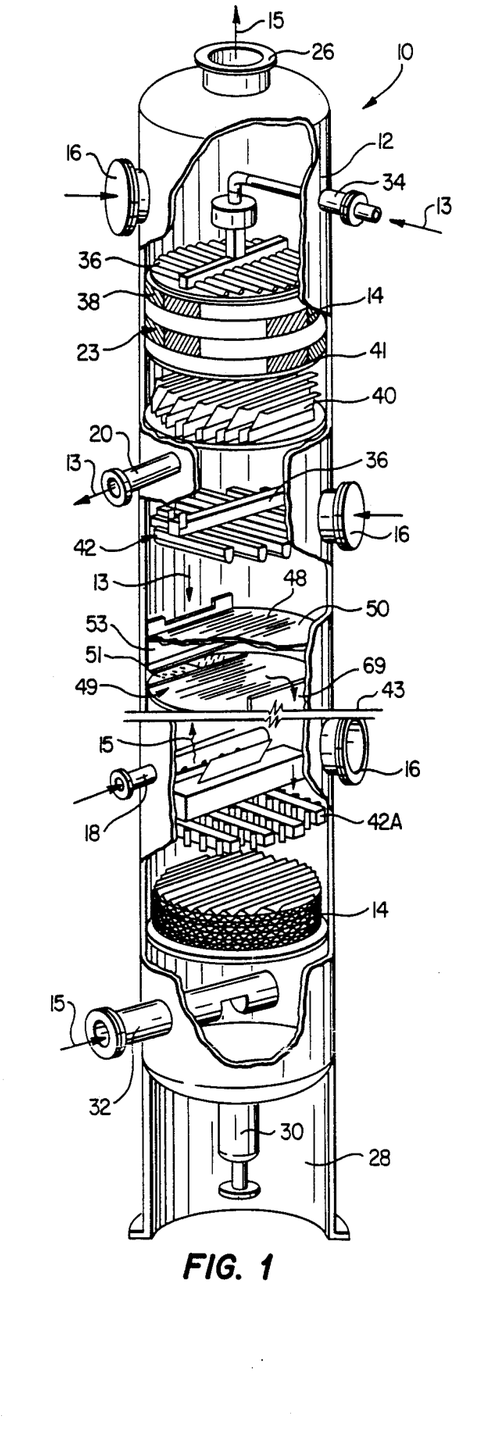
FIG. 1 is a perspective view of a packed column with various sections cut away for illustrating a variety of tower internals and one embodiment of a downcomer-tray assembly constructed in accordance with the principles of the present invention disposed therein.

Referring first to FIG. 1, there is shown a fragmentary, perspective view of an illustrative packed exchange tower or column with various sections cut away for showing a variety of tower internals and the utilization of one embodiment of the improved high capacity tray assembly of the present invention. The exchange column 10 of FIG. 1 comprises a cylindrical tower 12 having a plurality of packing bed layers 14 and trays disposed therein. A plurality of manways 16 are likewise constructed for facilitating access to the internal region of the tower 12. Also provided are side stream draw off line 20, liquid side feed line 18, and side stream vapor feed line or reboiler return line 32. A reflux return line 34 is provided atop the tower 10.

In operation, liquid 13 is fed into the tower 10 through reflux return line 34 and side stream feed input feed line 18. The liquid 13 flows downwardly through the tower and ultimately leaves the tower either at side stream draw off 20, or at bottom stream draw off line 30. In its downward flow, the liquid 13 is depleted of some material which evaporates from it as it passes through the trays and packing beds, and is enriched or added to by material which condenses into it out of the vapor stream.

Still referring to FIG. 1, the exchange column 10 is diagrammatically cut in half for purposes of clarity. In this illustration, the column 10 includes a vapor outlet in overhead line 26 disposed atop the tower 12 and a lower skirt 28 disposed in the lower region of the tower around bottom stream takeoff line 30 coupled to a reboiler (not shown). Reboiler return conduit 32 is shown disposed above the skirt 28 for recycling vapor therein upwardly through the trays and/or packing layers 14. Reflux from condensers is provided in the upper tower region 23 through entry conduit 34 wherein reflux is distributed throughout a liquid distributor 36 across upper packing bed 38. It may be seen that the upper packing bed 38 is of the structured packing variety. The regions of the exchange column 10 beneath the upper packing bed 38 are shown for the purpose of illustration and include a liquid collector 40 disposed beneath a support grid 41 in support of the upper structured packing 38. A liquid distributor 42, adapted for redistributing liquid 13, is likewise disposed there-beneath. A second type of distributor 42A is shown below the cut-line 43 and disposed above bed 14. The column 10 is presented with cut-line 43 for illustrating the fact that the tower internals arrangement is diagrammatical only and is provided for referencing various component arrays therein.

Referring still to FIG. 1, an assembly of a pair of trays is also shown for purposes of illustration. In many instances, process columns contain only packing, only trays, or combinations of packing and trays. The present illustration is, however, a combination for purposes of discussion of the overall tower and its operation. A trayed column usually contains a plurality of trays 48 of the type shown herein. In many instances, the trays 48 are valve or sieve trays. Such trays comprise plates which are perforated or slotted in construction. The vapor and the liquid engage at or along the tray and, in some assemblies, are permitted to flow through the same openings in a counter-current flow arrangement. Optimally, the vapor and liquid flows reach a level of stability. With the utilization of downcomers, to be described in more detail below, this stability may be achieved with a relatively low flow rate permitting the ascending vapor to mix with the descending liquid. In some embodiments no downcomers are used and the vapor and the liquid use the same openings, alternating as the respective pressures change. But such is not the case herein.

In the present embodiment, cross-flow trays 48 and 49 and downcomers 53 and 69 are illustrated. Tray 48 is of conventional design manifesting a conventional perforated, or slotted, surface 50. Tray 49, however, includes a raised inlet section 51 beneath downcomer 53, in accordance with the present invention, the region 51 is substantially planar and formed with a plurality of apertures. The apertures can be simple perforations or directional flow vanes, as will be described below, and are the result of a myriad of critical design considerations including liquid/vapor ratios, liquid cooling, liquid flow/back-mixing, foaming (froth), height, froth uniformity and the presence of solids or slurries therein. Corrosion is likewise a consideration of the various elements in the packed towers and the selection of the material, design, and the fabrication of the tower internal is, in many instances, the result of such considerations. The anatomy of process columns as shown in FIG. 1 is likewise described in more detail in an article by Gilbert Chen, entitled "Packed Column Internals" appearing in the Mar. 5, 1984 edition of *Chemical Engineering*, incorporated herein by reference.

Figure 2:
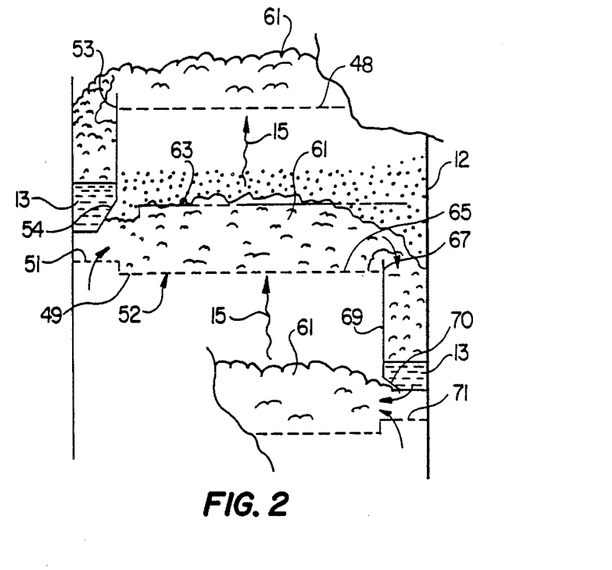
FIG. 2 is a diagrammatic, side-elevational, cross-sectional view of the improved downcomer-tray assembly of the present invention secured within a process tower and illustrating the flow of liquid and vapor thereacross.

Referring now to FIG. 2, there is shown a side-elevational, cross-sectional, diagrammatic view of one aspect of the present invention incorporated into the tray 48. An upper tray 48 comprises a planar panel that is perforated, as shown. The lower tray 49 is also of generally planar construction across its central active area 52. Liquid 13 travels down a downcomer 53 having a tapered or mitered bottom section 54, from tray 48 disposed thereabove. The mitered section 54 provides a clearance angle for vapor flow from the active inlet area. The liquid 13 engages vapor 15 discharged from the raised active panel area 51 beneath the downcomer 53. This engagement controls the direction of vapor and liquid flow across the central active region 52 of tray 49. The remaining ascending vapor 15 passing through the plurality of perforations 59 of said active region 52 creates a froth 61. The froth or "foam" is a region of aeration in which the phase of the liquid 13 is continuous. When the froth 61 does not exist or becomes discontinuous, an inversion to a gas-continuous regime can result in a "spray" of gas upwardly therethrough. With the downcomer-tray assembly of the present invention, the likelihood of this gas continuous regime is greatly reduced.

Still referring to FIG. 2, the froth 61 extends with a relatively uniform height, shown in phantom by line 63 across the width of the tray 49 to the opposite end 65 where a weir 67 is established for maintaining the froth height 63. The accumulated froth at this point flows over the top of the weir 67 into associated downcomer 69 that carries the froth downwardly into a mitered region 70 where the liquid accumulates and disperses upon active inlet region 71 therebeneath. Again active inlet region 71 is shown herein diagrammatically for purposes of illustration only. As stated herein, the area of holes and perforations for a single cross-flow plate establish the active length of the plate and the zone in which the froth 61 is established. By increasing the total active area by active inlet areas 51 and 71 greater capacity and efficiency is achieved. It is also the manner of flow of the liquid 13 across the tray 49 which, in the present embodiment, is critical to tray efficiency. A flow diagram of a conventional sieve plate will be discussed below for purposes of illustrating the efficiency afforded by the present invention.

Figure 3:
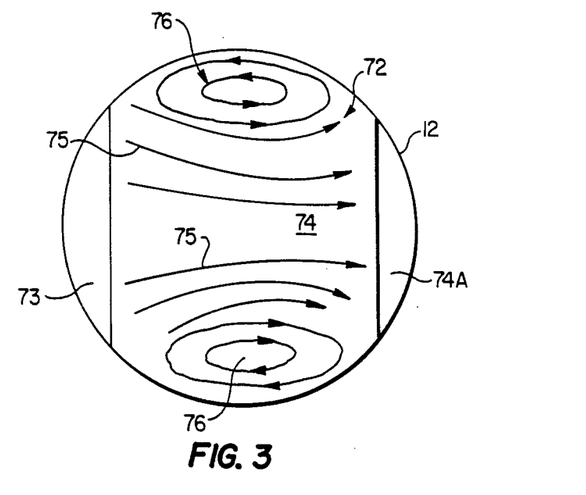
FIG. 3 is a top-plan, diagrammatic view of a prior art sieve plate illustrating the liquid flow thereacross.

Referring now to FIG. 3, there is shown a flow diagram across a conventional sieve plate. The prior art sieve plate 72 is illustrated herein as a round tray having a first conventional downcomer for feeding liquid upon a solid, underlying panel 73 and then to the tray 74. A second downcomer 74A carries liquid away from the tray. A plurality of arrows 75 illustrate the nonuniform flow of liquid 13 across a conventional plate. Recirculation cells 76 are shown to be formed on both sides of the plate lateral to the direction of flow. The formation of these retrograde flow areas, or recirculation cells, decreases the efficiency of the tray. These recirculation cells are the result of retrograde flow near the walls of the process column and this backflow problem becomes more pronounced as the diameter of the column increases. With the increase in retrograde flow and the resultant stagnation effect from the recirculation cells, concentration-difference driving force for mass transfer between the counter-flowing streams is reduced. The reduction in concentration-difference driving force will result in more contact or height requirement for a given separation in the column. Although back mixing is but a single aspect of plate efficiency, the reduction thereof is provided concurrently with the other advantages hereof. Reference is again made to the plate efficiency discussion set forth in above referenced, copending patent application Ser. No. 07/304,942.

Figure 4:
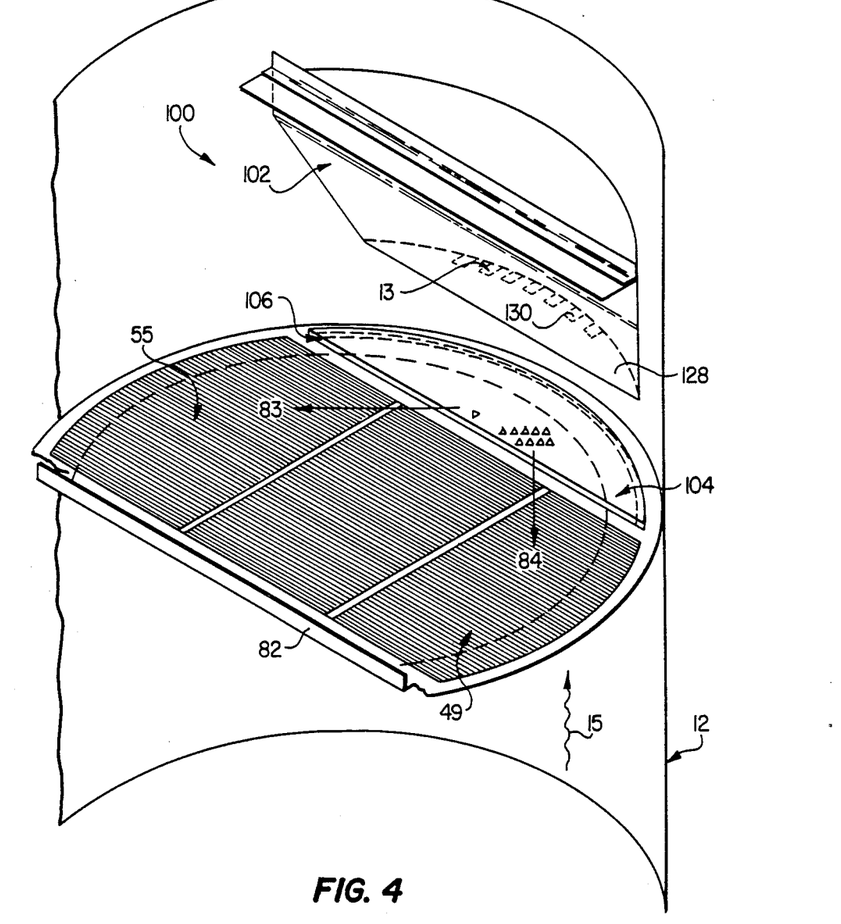
FIG. 4 is a perspective view of the downcomer-tray assembly of the present invention, with portions thereof cut away for purposes of clarity.

Referring now to FIG. 4, there is shown an enlarged, fragmentary perspective view of a downcomer-tray assembly 100 constructed in accordance with the principles of the present invention. The tray 49 as shown herein is constructed for placement in the tower 12 whereby a feeding downcomer 102 can be disposed over an inlet region 104 for providing liquid 13 to tray 49. A weir 82 is disposed on the opposite side of tray 49 whereby a second downcomer is disposed for carrying froth 61 and liquid 13 away from the tray 49. Liquid 13 spills down upon active inlet panel 104 and over upstanding edge 106 onto the tray 49. The liquid 13 flows across the tray in the direction of arrows 83 and 84. If the panel 104 is constructed with flow vanes, the flow directions will be induced by vapor flow from panel 104 and will be substantially uniform in accordance with the principles of the present invention and without the backflow problems discussed above. In this manner, the absence of back mixing will increase the concentration-difference driving force for mass transfer between the counter-flowing streams. The ascending vapor stream 15 will thus pass through the apertures defined between adjacent wires of the tray 49.

Figure 5:
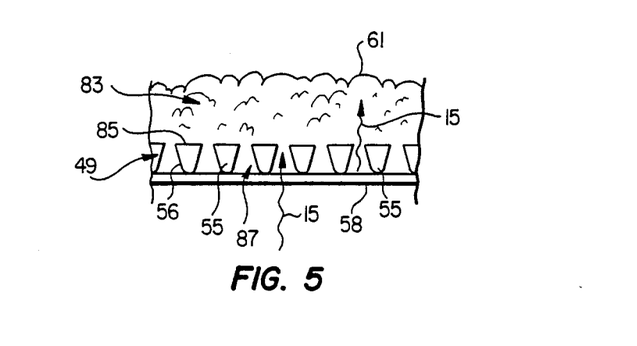
FIG. 5 is an enlarged, side elevational, cross sectional view of an active tray area taken along lines 5—5 of FIG. 4.

Referring now to FIG. 5, an enlarged, cross section of the tray assembly 49 is diagrammatically shown. In this embodiment, a sieve type tray is constructed with trapezoidal, or V-shaped, wires 55. It is incorporated into a SCREEN TRAY type sieve tray embodiment. SCREEN TRAY is a trademark of the assignee of the present invention and represents the central active area of tray 49 constructed with the array of V-shaped wires 55 disposed in generally parallel spaced relationship. The adjacent V-shaped wires 55 are secured by cross members 58 and form a "Venturi" shaped slit 87 between each of the wires resulting in very low energy loss. The relative size of the mesh 51 and tray 49 are not to scale and are presented by illustrating the tray assembly. Each wire 55 has a trapezoidal outer perimeter surface 56 forming the above defined tapered slit 87. Such a tray operates in the froth regime at maximum efficiency over a wide range of conditions. Gas 15 is thus shown rising to engage liquid 13 flowing orthogonal thereto from the downcomer 102 of FIG. 4. The result is a turbulent pattern of gas and liquid engagement effecting efficient mass transfer. Likewise, froth height is maximized, entrainment is minimized and low pressure drop results in reduced downcomer backup. The directionalized flow from the raised, active inlet panel 104 provides an enhancement in tray efficiency, with minimum height. It should also be noted that any style of apertures could be incorporated into the active area of tray 49. Although V-shaped wires are shown, bubble cap trays, other slotted openings, perforations, valves (both fixed and moveable) could be used with the present invention.

Figure 6:
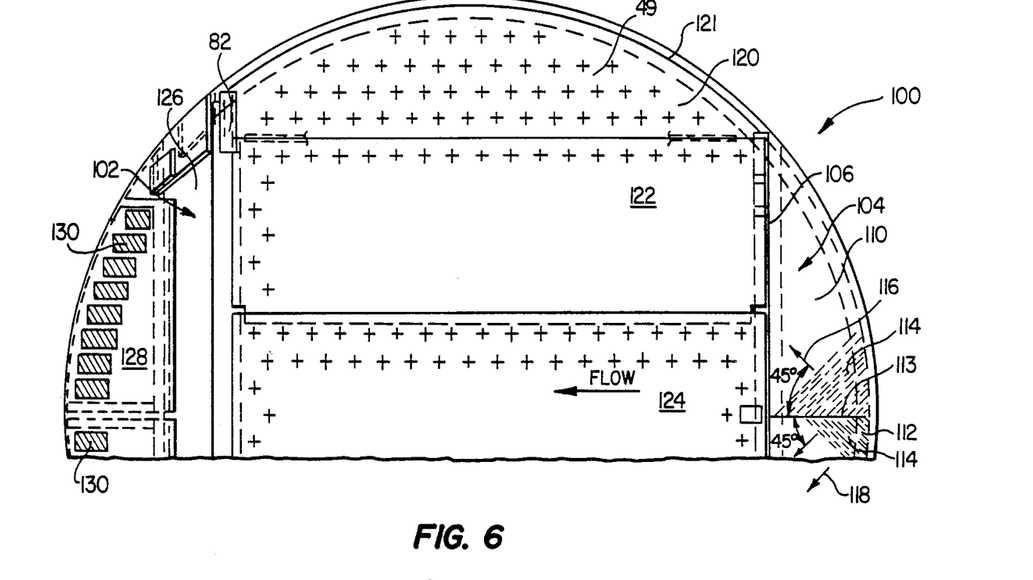
FIG. 6 is an enlarged, top plan view of the tray assembly of FIG. 4.

Referring now to FIG. 6, there is shown an enlarged top plan view of the tray 49 of FIG. 4. The tray 49 is constructed with a plurality of panel sections. These sections are not shown with aperture detail for purposes of clarity. Section 120 comprises an outer panel having an arcuate side wall 121. Panel 122 is secured adjacent panel 120 and is comprised of generally rectangular configuration. Panel 124 is likewise secured adjacent panel 122 and likewise comprises a generally rectangular configuration. Each of the panels 120, 122 and 124 are constructed of the appropriate tray material such as the sieve tray construction shown in FIG. 5. It may be seen that upstanding edge 106 is shown separating the trays 122 and 124 from the raised inlet panel 104.

Still referring to FIG. 6, the relative proportion of sizes between active inlet panel 104 and the central active area of tray 49 can be seen. Panel 104, in this particular embodiment, is comprised of first and second panel sections 110 and 112 which are welded together cross abutting joint 113 in abutting seam 113. Each panel 110 and 112 is constructed with louvers 114 facing in selected directions. Louvers 114 of panel 110 are angled to vector vapor flow in the direction of arrow 116. Likewise, louvers 114 and panel 112 are angled to vector vapor flow in the direction of arrow 118. The select vapor and liquid flow then occurs across the panels 120, 122 and 124 to the opposite downcomer. A downcomer panel 126 is shown sloped downwardly to a bottom discharge plate 128 in which rectangular apertures 130 are formed. Liquid accumulating above the apertures 130 flow therefrom onto the tray therebelow.

Figure 7:
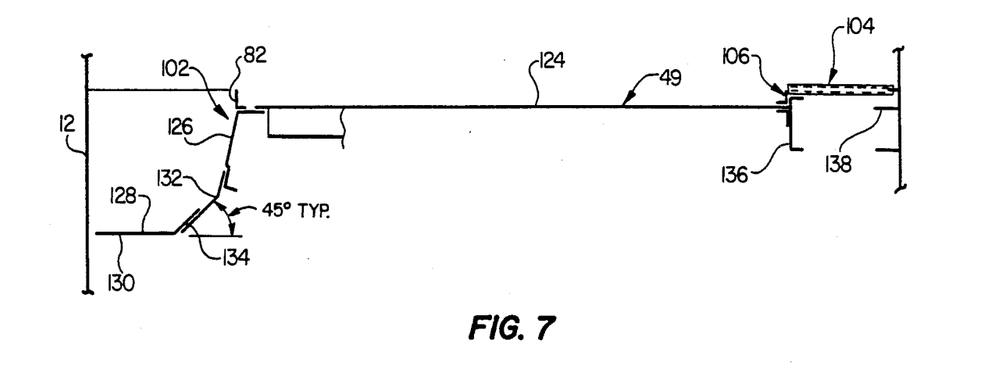
FIG. 7 is a diagrammatic, side elevational view of the downcomer-tray assembly of FIG. 6.

Referring now to FIG. 7, there is shown a side elevational, cross sectional view of the tray 49 of FIG. 6. The weir 82 is shown to be constructed of a generally L-shaped member adjacent the downcomer 102. The downcomer 102 is constructed with first sloping wall 126 which engages a second angulated sloping wall region 132. The angulated wall region 132 has a mitered section 134 which permits egress of ascending vapor from the raised panel therebeneath. Unlike prior art downcomer embodiments, it is critical to provide an angulated downcomer in this vicinity for effecting vapor passage from the raised inlet panel. With an active inlet panel where vapor flow is effected into direct engagement with liquid being discharged from the downcomer 102, the mitered section 134 is necessary. Likewise, the raised inlet panel opposite the downcomer region 102 is constructed with a first support 136 and outer support ring 138. These various members are shown diagrammatically for purposes of representing the general relationship between various structural members.

Figure 8:
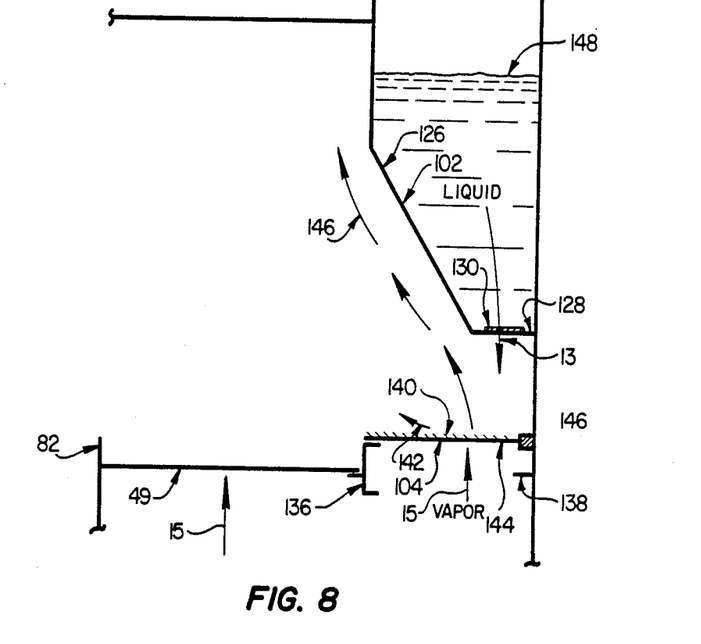
FIG. 8 is an enlarged, side elevational, fragmentary view of a downcomer-tray area of FIG. 4.

Referring now to FIG. 8, there is shown an enlarged, side elevational cross sectional view of the downcomer 102 and raised inlet panel 104 of FIG. 4. The downcomer 102 is seen to incorporate the select mitered section 134 as discussed above. The slots 130 are formed in the lower region thereof for discharging liquid 13 directly onto panel 104 into engagement with ascending vapor 15. The inlet panel 104 is seen to be formed with a plurality of directional flow vanes 140, in this particular embodiment, providing directionalized vapor flow in the direction of arrow 142. The vanes 140 are formed in a plate section 144 which may be comprised of louvered metal such as pre-expanded metal and/or other configurations conventionally used in vapor liquid contact towers. In this particular configuration a dynamic seal is thus created in the downcomer 102 by maintaining a liquid head 148 above the discharge slots 130.

Figure 9:
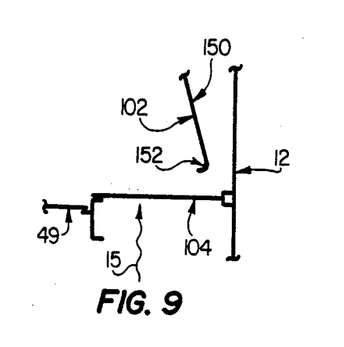
FIG. 9 is an alternative embodiment of the downcomer of FIG. 8.

Referring now to FIG. 9, there is shown an alternative embodiment of the downcomer panel assembly in FIG. 8. The downcomer mitered section 134 is constructed with a sloped section 150 terminating in a Venturi flange 152. The entire downcomer region adjacent Venturi flange 152 may remain open for purposes of vectoring liquid therefrom and creating a lower pressure area therein.

Figure 10:
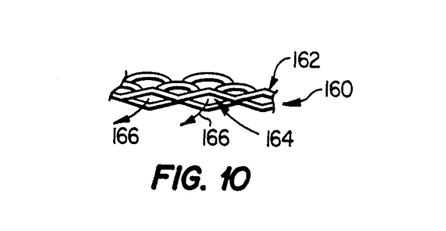
FIG. 10 is an enlarged, fragmentary perspective view of the active inlet area of FIG. 4.

Referring now to FIG. 10, there is shown an enlarged, fragmentary perspective view of a section of the panel of the plate 144 of FIG. 8. In this particular configuration a pre-expanded type of metal plate is used having a plurality of twisted lands 162 forming slotted apertures 164 therein. Any number of louver designs could be used. Vapor passes therethrough in the direction of arrow 166 due to the angular relationship between the twisted lands 162 and the slitted apertures 164. This panel section 160 comprises but one embodiment of the present invention for affording select vapor passage from the raised inlet panel of the present invention.

Figure 11:
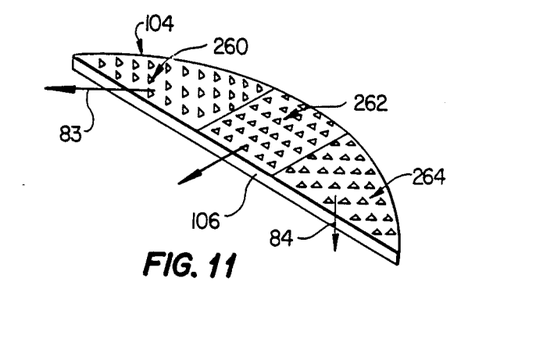
FIG. 11 is a top plan view of an alternative embodiment of the active inlet panel of FIG. 4.

Referring now to FIG. 11, it may be seen that a plurality of panels 260, 262, 264 may be incorporated in raised section 104. These panels utilize directional flow vanes and the central panel 262 vectors vapor directly across the plate 49 while outer panels 260 and 264 direct vapor flow outwardly thereof to reduce retrograde flow thereacross In this manner, the downcomer 102 may be provided with increased efficiency and enhanced vapor liquid interaction. The raised active inlet area 104 increases the total active area of the particular plate to which it is affixed and the directional flow vanes maximize vapor liquid contact as liquid is discharged directly from the downcomer. It should be noted that this entire panel section could be inclined within the meaning of substantially uniformly raised as used herein. Utilization of a static seal in the downcomer further simplifies the construction and maximizes the efficiency of operation. The directional vanes are provided in the active inlet panels in the requisite directions for accommodating proper flow and maintaining flow equilibrium. This prevents retrograde flow prior to the liquid engaging the opposite downcomer 82 across the plate 49. These factors increase the efficiency of the plate. All of these effects enhance mass transfer efficiency while maintaining high capacity and they represent a marked improvement over the prior art.

It is thus believed that the operation and construction of the present invention will be apparent from the foregoing description. While the method and apparatus shown or described has been characterized as being preferred it will be obvious that various changes and modifications may be made therein without departing from the spirit and scope of the invention as defined in the following claims.

What is claimed is:

1. An improved downcomer-tray assembly for a process column of the type wherein liquid flows downwardly through the discharge area of a first downcomer onto a first tray and across the active area thereof through which vapor flows upwardly for interaction and mass transfer with the liquid before passing therefrom by a second downcomer, said improvement comprising a substantially uniformly raised active inlet area comprising upwardly extending portions of the tray itself and having gas flow openings disposed beneath said discharge area of said first downcomer for facilitating ascending vapor flow immediately beneath said discharge areas of said downcomer by uniformly reducing the height of liquid thereabove relative to the height of liquid above the active areas of said tray and injecting said ascending vapor into direct engagement with liquid being discharged from said downcomer.

2. The apparatus as set forth in claim 1 wherein said downcomer is constructed for providing a dynamic seal against ascending vapor flow.

3. The apparatus as set forth in claim 2 wherein said downcomer is constructed with a sufficiently narrow fluid discharge region that is spaced above said active inlet region for establishing a fluid reservoir and uniform discharge thereon.

4. The apparatus as set forth in claim 3 wherein said discharge region comprises a plurality of apertures formed thereacross and disposed above said active inlet area in generally parallel spaced relationship thereto.

5. The apparatus as set forth in claim 3 wherein said discharge region comprises a tapered Venturi area formed thereacross and disposed above said active inlet area in generally parallel spaced relationship thereto.

6. The apparatus as set forth in claim 1 wherein said downcomer is constructed in a chordal section of said process column and said active inlet area is a chordal region of said first tray.

7. The apparatus as set forth in claim 1 wherein said second downcomer includes a weir secured therealong and said active inlet area is raised to a height on the order of the height of said weir disposed along said second downcomer.

8. The apparatus as set forth in claim 1 wherein said raised active area comprises an inlet panel constructed with a plurality of directional vapor flow vanes formed therethrough for imparting directionalized, preferential vapor flow therein relative to said active area of said first tray.

9. The apparatus as set forth in claim 8 wherein said inlet panel comprises first and second substantially planar, apertured regions, said first apertured region having flow vanes disposed an angle relative to flow vanes of said second apertured region.

10. The apparatus as set forth in claim 9 wherein said flow vanes of said first and second apertured regions being oriented generally orthogonal one to the other for imparting vapor flow in different directions therefrom.

11. The apparatus as set forth in claim 8 wherein said inlet panel comprises first, second and third apertured regions, said first apertured region disposed intermediate of said second and third regions for imparting directionalized flow across an intermediate section of said tray with said second and third regions directing flow outwardly thereof for reducing retrograde flow thereacross.

12. The apparatus as set forth in claim 8 wherein said inlet panel comprises at least one pre-expanded metal section having twisted lands and slotted apertures forming louvers thereacross.

13. The apparatus as set forth in claim 1 wherein said first tray comprises a sieve tray.

14. The apparatus as set forth in claim 13 wherein said sieve tray is constructed of a plurality of wires having a generally trapezoidal cross section and secured one to the other in generally parallel spaced relationship.

15. An improved downcomer-tray assembly for a process column of the type wherein liquid flows downwardly through the discharge areas of a first downcomer onto a first tray and across the active area thereof through which vapor flows upwardly for interaction and mass transfer with the liquid before passing therefrom by a second downcomer, said improvement comprising a substantially uniformly raised active inlet area disposed beneath said discharge area of said first downcomer, said raised active areas comprising upwardly extending portions of the tray itself and being constructed with gas flow openings positioned to facilitate ascending vapor flow immediately beneath said discharge area of said downcomer by reducing the height of liquid thereabove relative to the height of liquid above the active area of said tray and comprising a raised inlet panel constructed with a plurality of directional vapor flow vanes formed therethrough for imparting directionalized, vapor flow into said liquid being discharged from said discharge area of said downcomer prior to its flow across said active area of said first tray.

16. An improved method of mixing vapor with liquid discharged from a discharge area of a downcomer of a process column onto an underlying tray and across the active area thereof, said method being of the type wherein descending liquid mixes with ascending vapor flow through said tray, said improvement comprising the steps of disposing a substantially uniformly raised active inlet area comprising upwardly extending portions of the tray itself and having gas flow openings beneath said discharge area of said downcomer adjacent said tray, facilitating ascending vapor flow immediately beneath said discharge areas of said downcomer by uniformly reducing the height of liquid thereabove to the height of liquid above said active area of said tray for imparting preferential vapor flow therethrough relative to said tray, and injecting said ascending vapor flow directly into said liquid being discharged from said downcomer.

17. The method as set forth in claim 16 and including the step of constructing said downcomer with a discharge region adapted for providing a dynamic seal against ascending vapor flow.

18. The method as set forth in claim 16 wherein the step of providing said active inlet area includes the step of forming a uniformly raised active inlet area panel with a plurality of directional vapor flow vanes disposed therein.

19. The method as set forth in claim 18 and further including the steps of providing first and second panels, constructing said panels with a plurality of directional flow vanes disposed at different angles one to the other, securing said first and second panels beneath said discharge area of said downcomer, and imparting vapor flow therefrom at different angles.

* * * * *

UNITED STATES PATENT AND TRADEMARK OFFICE
CERTIFICATE OF CORRECTION

PATENT NO. : 4,956,127

DATED : September 11, 1990

INVENTOR(S) : Michael J. Binkley, John T. Thorngren, Jorge A. Bonilla, Gary W. Gage It is certified that error appears in the above-identified patent and that said Letters Patent is hereby corrected as shown below:

Column 10, line 51    delete "thereacross In"
                                     insert --thereacross. In--

Column 11, line 23    delete "areas"
                                     insert --area--

Column 11, line 25    delete "areas"
                                     insert --area--

Column 12, line 16    delete "areas"
                                     insert --area--

Column 12, line 23    delete "areas"
                                     insert --area--

Column 12, line 46    delete "areas"
                                     insert --area--

Column 12, line 47    delete "thereabove to"
                                     insert --thereabove relative to--

Signed and Sealed this

Seventh Day of January, 1992

*Attest:*

HARRY F. MANBECK, JR.

*Attesting Officer*                               *Commissioner of Patents and Trademarks*